(12) United States Patent
Tamura et al.

(10) Patent No.: US 12,722,665 B2
(45) Date of Patent: Sep. 1, 2026

(54) VEHICLE CONTROL DEVICE, METHOD, AND STORAGE MEDIUM FOR SWITCHING A DRIVING MODE BASED ON ROAD LINE ANGLE, DISTANCE, AND REGION

(71) Applicant: HONDA MOTOR CO., LTD., Tokyo (JP)

(72) Inventors: Takao Tamura, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 362 days.

(21) Appl. No.: 18/231,259

(22) Filed: Aug. 8, 2023

(65) Prior Publication Data

US 2024/0051584 A1 Feb. 15, 2024

(30) Foreign Application Priority Data

Aug. 10, 2022 (JP) ................................ 2022-128410

(51) Int. Cl.
*B60W 60/00* (2020.01)
*B60W 40/02* (2006.01)

(52) U.S. Cl.
CPC ........ *B60W 60/0053* (2020.02); *B60W 40/02* (2013.01); *B60W 2420/403* (2013.01); *B60W 2552/53* (2020.02)

(58) Field of Classification Search
None
See application file for complete search history.

(56) References Cited

U.S. PATENT DOCUMENTS

2016/0259335 A1 9/2016 Oyama
2017/0316684 A1* 11/2017 Jammoussi .......... G08G 1/0112
(Continued)

FOREIGN PATENT DOCUMENTS

JP 11-211492 8/1999
JP 2001-291197 10/2001
(Continued)

OTHER PUBLICATIONS

Japanese Notice of Allowance for Japanese Patent Application No. 2022-128410 mailed Dec. 22, 2023.

*Primary Examiner* — James J Lee
*Assistant Examiner* — Tawri M McAndrews
(74) *Attorney, Agent, or Firm* — Amin, Turocy & Watson, LLP

(57) ABSTRACT

Provided is a vehicle control device configured to: recognize a surrounding situation of a vehicle; control steering and acceleration/deceleration of the vehicle based on the recognized surrounding situation and map information; determine a driving mode of the vehicle as any one of a plurality of driving modes including a first driving mode and a second driving mode; change the driving mode of the vehicle to a driving mode imposing a heavier task when the task of the determined driving mode is not performed by the driver; determine whether or not a determination angle is equal to or larger than a first threshold value, whether or not a determination distance is equal to or larger than a second threshold value, and whether or not a forward region of the vehicle corresponds to a predetermined region; and change the second driving mode to the first driving mode depending on the determination.

13 Claims, 7 Drawing Sheets

(56) References Cited

U.S. PATENT DOCUMENTS

| | | | | |
|---|---|---|---|---|
| 2017/0336515 | A1* | 11/2017 | Hosoya | G01C 21/28 |
| 2020/0166364 | A1* | 5/2020 | Fujita | G06F 8/65 |
| 2020/0247407 | A1 | 8/2020 | Huang et al. | |
| 2020/0298867 | A1* | 9/2020 | Gazda | B60W 60/0059 |
| 2020/0331458 | A1* | 10/2020 | Nakamura | B60W 30/182 |
| 2021/0191418 | A1* | 6/2021 | Ohkado | G05D 1/0246 |
| 2021/0291830 | A1 | 9/2021 | Tamura | |
| 2022/0194413 | A1* | 6/2022 | Westman | G01S 17/931 |
| 2023/0109155 | A1* | 4/2023 | Takehara | B62D 15/025 701/26 |

FOREIGN PATENT DOCUMENTS

| | | |
|---|---|---|
| JP | 2016-162299 | 9/2016 |
| JP | 2017-061265 | 3/2017 |
| JP | 2018-045500 | 3/2018 |
| JP | 2021-149321 | 9/2021 |

* cited by examiner

FIG. 2

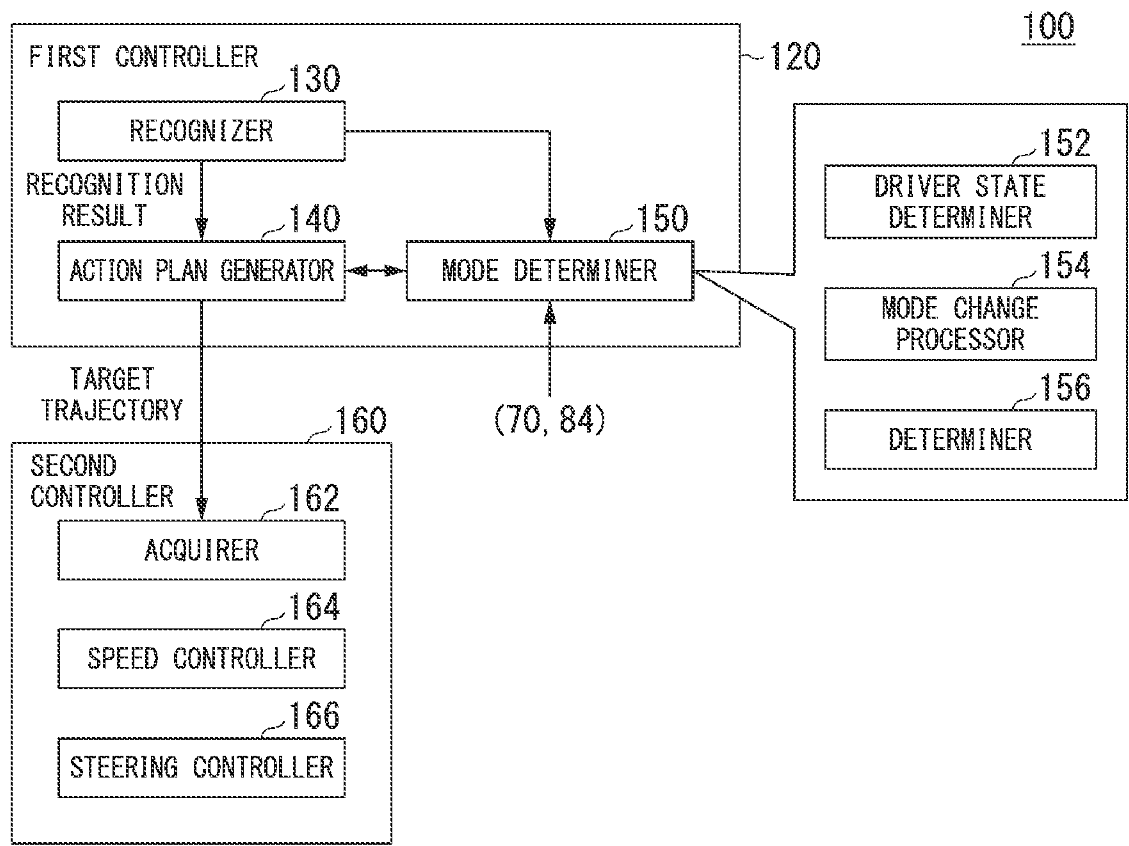

FIG. 3

| DRIVING MODE | CONTROL STATE | TASK |
|---|---|---|
| MODE A | AUTOMATIC DRIVING | MONITORING OF FRONT FIELD OF VIEW:UNNECESSARY GRASP OF STEERING WHEEL:UNNECESSARY |
| MODE B | DRIVING ASSISTANCE | MONITORING OF FRONT FIELD OF VIEW:NECESSARY GRASP OF STEERING WHEEL:UNNECESSARY |
| MODE C | DRIVING ASSISTANCE | MONITORING OF FRONT FIELD OF VIEW:NECESSARY GRASP OF STEERING WHEEL:NECESSARY |
| MODE D | DRIVING ASSISTANCE | MONITORING OF FRONT FIELD OF VIEW:NECESSARY AT LEAST SOME DRIVING OPERATION IS REQUIRED |
| MODE E | MANUAL DRIVING | MONITORING OF FRONT FIELD OF VIEW:NECESSARY DRIVING OPERATION IS REQUIRED FOR BOTH OF STEERING AND ACCELERATION/DECELERATION |

TASK:LIGHTER

TASK:HEAVIER

LCL
CCL
RCL
LML
CML
RML
M

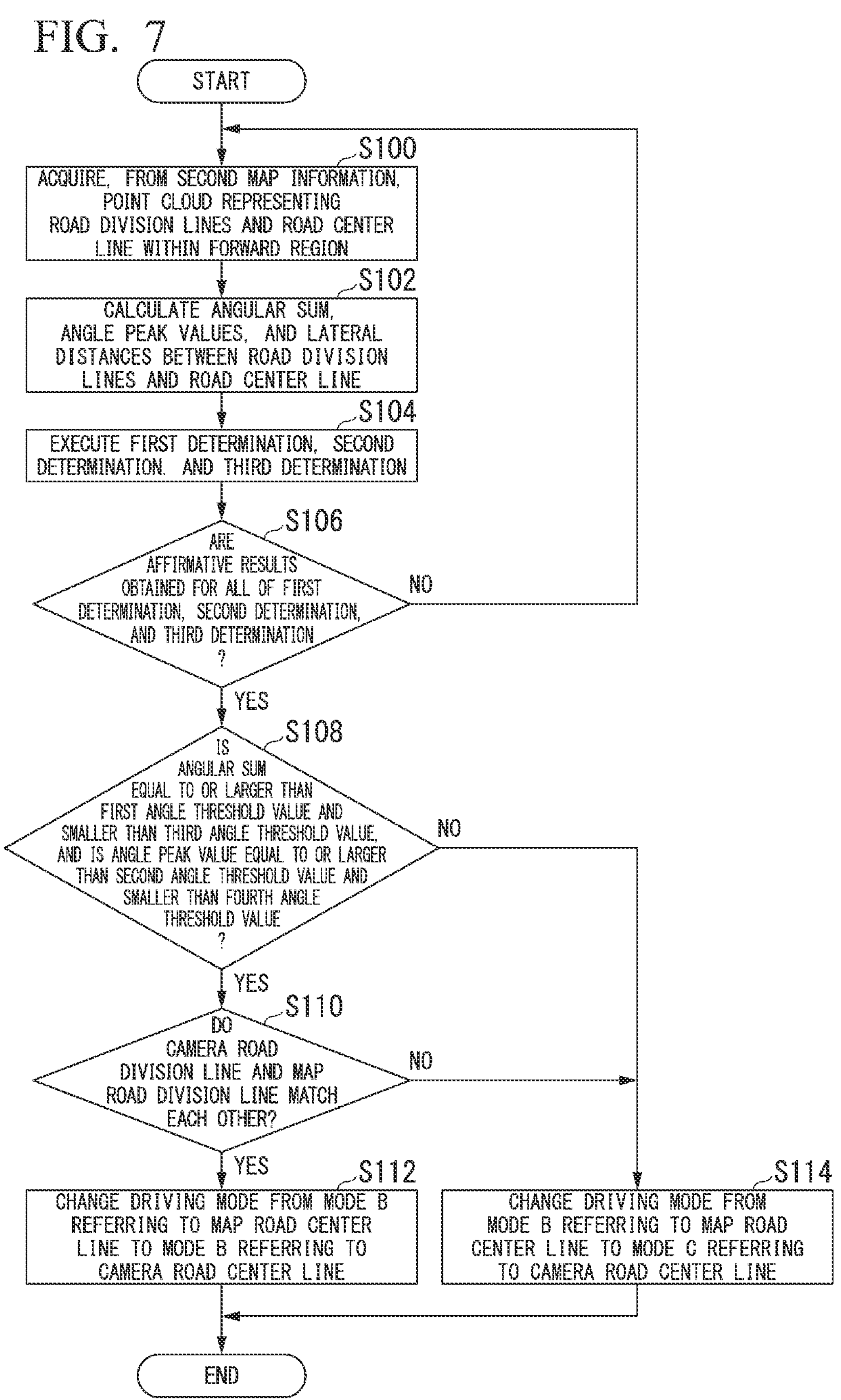
FIG. 7
START
S100
ACQUIRE, FROM SECOND MAP INFORMATION, POINT CLOUD REPRESENTING ROAD DIVISION LINES AND ROAD CENTER LINE WITHIN FORWARD REGION
S102
CALCULATE ANGULAR SUM, ANGLE PEAK VALUES, AND LATERAL DISTANCES BETWEEN ROAD DIVISION LINES AND ROAD CENTER LINE
S104
EXECUTE FIRST DETERMINATION, SECOND DETERMINATION, AND THIRD DETERMINATION
S106
ARE AFFIRMATIVE RESULTS OBTAINED FOR ALL OF FIRST DETERMINATION, SECOND DETERMINATION, AND THIRD DETERMINATION ?
NO
YES
S108
IS ANGULAR SUM EQUAL TO OR LARGER THAN FIRST ANGLE THRESHOLD VALUE AND SMALLER THAN THIRD ANGLE THRESHOLD VALUE, AND IS ANGLE PEAK VALUE EQUAL TO OR LARGER THAN SECOND ANGLE THRESHOLD VALUE AND SMALLER THAN FOURTH ANGLE THRESHOLD VALUE ?
NO
YES
S110
DO CAMERA ROAD DIVISION LINE AND MAP ROAD DIVISION LINE MATCH EACH OTHER?
NO
YES
S112
CHANGE DRIVING MODE FROM MODE B REFERRING TO MAP ROAD CENTER LINE TO MODE B REFERRING TO CAMERA ROAD CENTER LINE
S114
CHANGE DRIVING MODE FROM MODE B REFERRING TO MAP ROAD CENTER LINE TO MODE C REFERRING TO CAMERA ROAD CENTER LINE
END

VEHICLE CONTROL DEVICE, METHOD, AND STORAGE MEDIUM FOR SWITCHING A DRIVING MODE BASED ON ROAD LINE ANGLE, DISTANCE, AND REGION

CROSS-REFERENCE TO RELATED APPLICATION

The application is based on Japanese Patent Application No. 2022-128410 filed on Aug. 10, 2022, the content of which is incorporated herein by reference.

BACKGROUND

Field of the Invention

The present invention relates to a vehicle control device, a vehicle control method, and a storage medium.

Description of Related Art

Hitherto, the technology of controlling a vehicle based on map road division line information and camera road division line information photographed by a camera mounted in a vehicle. For example, Japanese Patent Application Laid-open No. 2017-61265 describes performing lane keeping control referring to camera road division line information when the camera road division line information matches map road division line information, whereas performing lane keeping control referring to previous camera road division line information and map road division line information when the camera road division line information does not match the map road division line information.

SUMMARY

However, although the related art executes vehicle driving control by inspecting the degree of match between the camera road division line information and the map road division line information, the related art does not perform driving control by inspecting the center line of the travel lane. As a result, driving control cannot be executed appropriately in some cases referring to the center line of the travel lane.

The present invention has been made in view of the above-mentioned circumstances, and has an object to provide a vehicle control device, a vehicle control method, and a storage medium, which are capable of executing driving control appropriately referring to the center line of the travel lane.

A vehicle control device, a vehicle control method, and a storage medium according to the present invention adopt the following configuration.

(1): According to an embodiment of the present invention, there is provided a vehicle control device comprising a storage medium storing computer-readable commands, and a processor connected to the storage medium, the processor being configured to execute the computer-readable commands to: recognize a surrounding situation of a vehicle; control steering and acceleration/deceleration of the vehicle based on the recognized surrounding situation and map information without depending on an operation performed by a driver of the vehicle; determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver; change the driving mode of the vehicle to a driving mode imposing a heavier task when the task of the determined driving mode is not performed by the driver; determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to the camera road division line included in the surrounding situation when it is determined that the determination angle is equal to or larger than the first threshold value, the determination distance is equal to or larger than the second threshold value, and the forward region of the vehicle does not correspond to the predetermined region.

(2) In the aspect (1), the processor defines the determination angle as a sum of an average value of the map road division line on a left side and the map road center line and an average value of the map road division line on a right side and the map road center line.

(3): In the aspect (1), the processor defines the determination angle as at least one of a peak angle between the map road division line on a left side and the map road center line and a peak angle between the map road division line on a right side and the map road center line.

(4): In the aspect (1), the processor determines whether or not the determination angle is equal to or larger than the first threshold value and is equal to or smaller than a third threshold value, which is larger than the first threshold value, and when determining that the determination angle is equal to or larger than the first threshold value and is equal to or smaller than the third threshold value, continues the second driving mode referring to the camera road division line.

(5): In the aspect (4), when determining that the determination angle is equal to or larger than the first threshold value and is equal to or smaller than the third threshold value, the processor determines whether or not the map road division line and the camera road division line match each other for at least a part thereof, and when determining that the map road division line and the camera road division line match each other for at least a part thereof, the processor continues the second driving mode referring to the camera road division line.

(6): In the aspect (5), even when determining that the map road division line and the camera road division line do not match each other for at least a part thereof, the processor continues the second driving mode referring to at least a travel trajectory of a preceding vehicle when there is a preceding vehicle in front of the vehicle.

(7): In the aspect (1), the processor defines the determination distance as at least one of a distance between the map road division line on a left side and the map road center line and a distance between the map road division line on a right side and the map road center line.

(8): In the aspect (1), the processor defines the predetermined region as a lane increase section, a lane decrease section, or a section in which a road curvature is equal to or larger than a predetermined value on a travel lane on which the vehicle is traveling.

(9): In the aspect (1), when the number of points included in a point cloud constituting the map road division line and the map road center line included in the map information is equal to or larger than a predetermined value, the processor calculates the determination angle and the determination distance based on the point cloud.

(10): In the aspect (1), when the second driving mode is changed to the first driving mode referring to the camera road division line, the processor continues the first driving mode referring to the camera road division line for at least a first predetermined period.

(11): In the aspect (10), when determining that the determination angle is smaller than the first threshold value and the determination distance is smaller than the second threshold value after continuing the first driving mode referring to the camera road division line for the first predetermined period, the processor returns the first driving mode referring to the camera road division line to the second driving mode referring to the map road division line.

(12): In the aspect (1), when it is determined that the determination angle is equal to or larger than the first threshold value or the determination distance is equal to or larger than the second threshold value after continuing the first driving mode referring to the camera road division line for a second predetermined period, the processor changes the first driving mode to manual driving of the vehicle by the driver of the vehicle.

(13): According to another aspect of the present invention, there is provided a vehicle control method to be executed by a computer, the vehicle control method including: recognizing a surrounding situation of a vehicle; controlling steering and acceleration/deceleration of the vehicle based on the recognized surrounding situation and map information without depending on an operation performed by a driver of the vehicle; determining a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver; changing the driving mode of the vehicle to a driving mode imposing a heavier task when the task of the determined driving mode is not performed by the driver; determining whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and changing the second driving mode to the first driving mode referring to the camera road division line included in the surrounding situation when it is determined that the determination angle is equal to or larger than the first threshold value, the determination distance is equal to or larger than the second threshold value, and the forward region of the vehicle does not correspond to the predetermined region.

(14): According to another aspect of the present invention, there is provided a non-transitory storage medium storing a program for causing a computer to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver; change the driving mode of the vehicle to a driving mode imposing a heavier task when the task of the determined driving mode is not performed by the driver; determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to the camera road division line included in the surrounding situation when it is determined that the determination angle is equal to or larger than the first threshold value, the determination distance is equal to or larger than the second threshold value, and the forward region of the vehicle does not correspond to the predetermined region.

According to the aspects (1) to (14), it is possible to execute driving control appropriately based on the center line of the travel lane.

BRIEF DESCRIPTION OF THE DRAWINGS

FIG. 2 is a functional configuration diagram of a first controller and a second controller.

FIG. 3 is a diagram illustrating an example of a correspondence relationship among a driving mode, the control state of a host vehicle, and a task.

FIG. 6 is a diagram illustrating an example of mode change processing to be executed by a mode determiner.

FIG. 7 is a flow chart illustrating an example of processing to be executed by the vehicle control device according to an embodiment.

DESCRIPTION OF EMBODIMENTS

Now, a vehicle control device, a vehicle control method, and a storage medium according to an embodiment of the present invention are described with reference to the drawings.

[Overall Configuration]

Figure 1:
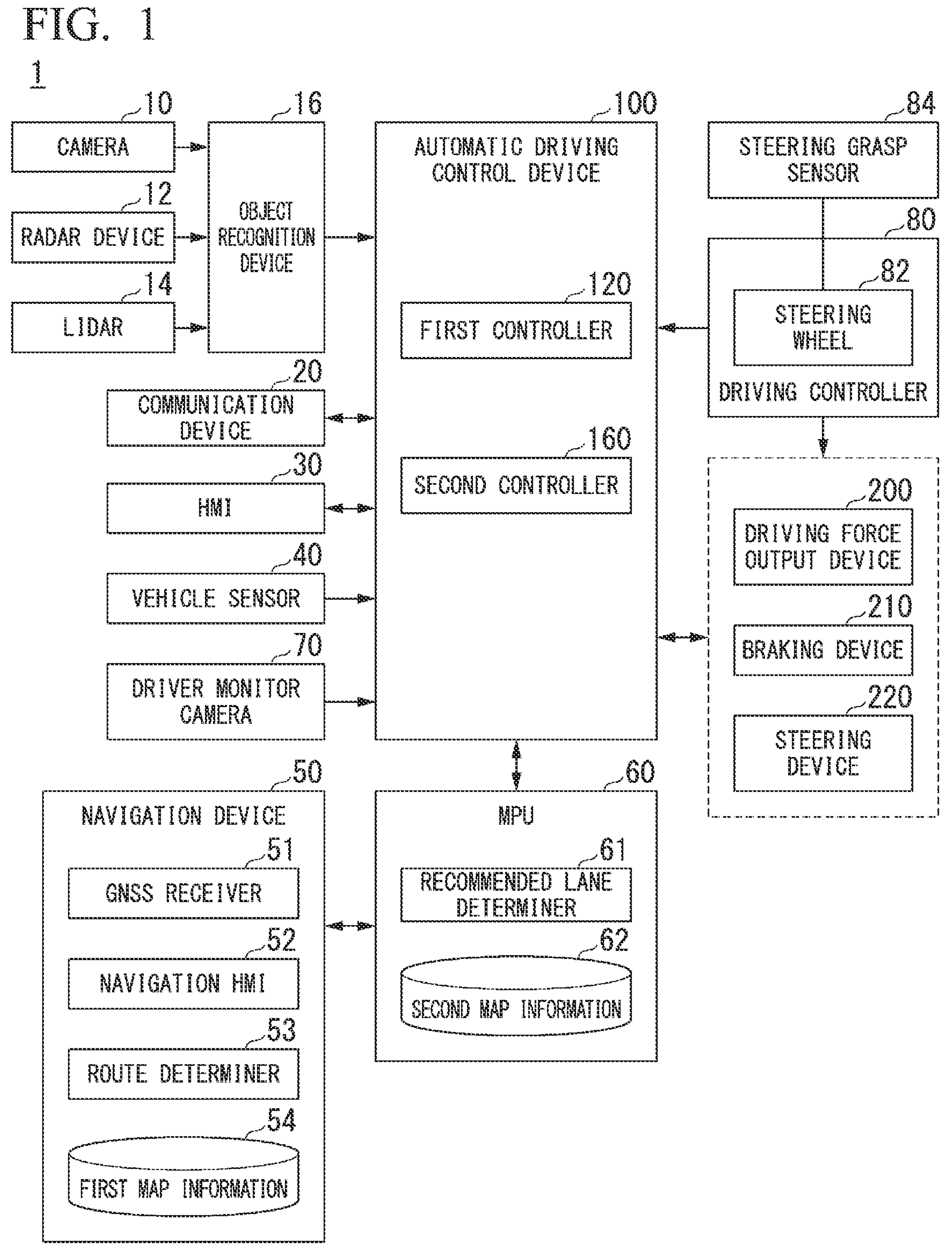
FIG. 1 is a configuration diagram of a vehicle system that uses a vehicle control device according to an embodiment.

FIG. 1 is a configuration diagram of a vehicle system 1 that uses a vehicle control device according to an embodiment. A vehicle including the vehicle system 1 is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generator connected to the internal combustion engine or power discharged by a secondary battery or a fuel cell.

The vehicle system 1 includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, an MPU (Map Positioning Unit) 60, a driver monitoring camera 70, a driving controller 80, an automatic driving control device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added.

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "host vehicle M") including the vehicle system 1. When the camera 10 picks up a front image, the camera 10 is mounted on, for example, an upper part of a front windshield or a back surface of a rear-view mirror. The camera 10 repeatedly photographs the surroundings of the host vehicle M periodically, for example. The camera 10 may be a stereo camera.

The radar device 12 radiates a radio wave such as a millimeter wave toward the surroundings of the host vehicle M, and detects a radio wave (reflected wave) reflected by an object, to detect at least the position (distance and direction) of the object. The radar device 12 is mounted on any part of the host vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the host vehicle M, and measures diffused light. The LIDAR 14 detects a distance to a target based on a period of time since emission of light until reception of light. The light to be radiated is, for example, pulsed laser light. The LIDAR 14 is mounted on any part of the host vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the automatic driving control device 100. The object recognition device 16 may output the results of detection by the camera 10, the radar device 12, and the LIDAR 14 to the automatic driving control device 100 as they are. The object recognition device 16 may be omitted from the vehicle system 1.

The communication device 20 uses, for example, a cellular network, a Wi-Fi network, Bluetooth (trademark), or DSRC (Dedicated Short Range Communication) to communicate with another vehicle existing near the host vehicle M or communicate with various kinds of server devices via a radio base station.

The HMI 30 presents various kinds of information to an occupant of the host vehicle M, and receives input of an operation by the occupant. The HMI includes, for example, various kinds of display devices, speakers, buzzers, touch panels, switches, and keys.

The vehicle sensor 40 includes, for example, a vehicle speed sensor that detects a speed of the host vehicle M, an acceleration sensor that detects an acceleration, a yaw rate sensor that detects an angular speed with respect to a vertical axis, and an orientation sensor that detects an orientation of the host vehicle M.

The navigation device 50 includes, for example, a GNSS (Global Navigation Satellite System) receiver 51, a navigation HMI 52, and a route determiner 53. The navigation device 50 holds first map information 54 in a storage device such as an HDD (Hard Disk Drive) or a flash memory. The GNSS receiver 51 identifies the position of the host vehicle M based on a signal received from a GNSS satellite. The position of the host vehicle M may be identified or complemented by an INS (Inertial Navigation System) that uses output of the vehicle sensor 40. The navigation HMI 52 includes, for example, a display device, a speaker, a touch panel, and a key. The navigation HMI 52 and the HMI 30 described above may be integrated partially or completely. The route determiner 53 refers to the first map information 54 to determine a route (hereinafter referred to as "map route") from the position (or any input position) of the host vehicle M identified by the GNSS receiver 51 to a destination input by an occupant by using the navigation HMI 52, for example. The first map information 54 is, for example, information representing road structure by a link indicating a road and nodes connected by the link. The first map information 54 may include, for example, a curvature of a road and POI (Point Of Interest) information. The map route is output to the MPU 60. The navigation device 50 may guide a route by using the navigation HMI 52 based on the map route. The navigation device 50 may be implemented by, for example, the function of a terminal device such as a smartphone or a tablet terminal held by the occupant. The navigation device 50 may transmit the current position and the destination to a navigation server via the communication device 20, and acquire a route similar to the map route from the navigation server.

The MPU 60 includes, for example, a recommended lane determiner 61, and holds second map information 62 in a storage device such as an HDD or a flash memory. The recommended lane determiner 61 divides the map route provided by the navigation device 50 into a plurality of blocks (for example, at intervals of 100 [m] with respect to a vehicle travel direction), and determines a recommended route for each block with reference to the second map information 62. The recommended lane determiner 61 determines on which lane the host vehicle M is to travel. When there is a junction on a map route, the recommended lane determiner 61 determines a recommended route so that the host vehicle M can travel on a route for efficiently entering the junction.

The second map information 62 is map information having higher precision than that of the first map information 54. The second map information 62 includes, for example, information on the center of a lane or information on the boundary of a lane. In particular, in this embodiment, the second map information 62 includes information relating to left and right road division lines (hereinafter sometimes referred to as "map road division line") on the lane and a center line (hereinafter sometimes referred to as "map road center line") on the lane. The second map information 62 may further include, for example, road information, traffic regulation information, address information (address or postal code), facility information, phone number information, and information on a section in which a mode A or mode B described later is prohibited. The second map information 62 may be updated appropriately through communication between the communication device 20 and another device.

The driver monitor camera 70 is, for example, a digital camera that uses a solid image pickup device such as a CCD or a CMOS. The driver monitor camera 70 is mounted on any part of the host vehicle M at a position and in a direction so as to be capable of picking up a front image of a head of an occupant (hereinafter referred to as "driver") sitting on a driver seat of the host vehicle M (in the direction of picking up an image of the face). For example, the driver monitor camera 70 is mounted on an upper part of a display device provided on the center of an instrumental panel of the host vehicle M.

The driving controller 80 includes, for example, an acceleration pedal, a brake pedal, a gear shift, and other controllers in addition to the steering wheel 82. A sensor that detects an operation amount or whether an operation is applied is mounted on the driving controller 80, and the detection result is output to the automatic driving control device 100 or a part or all of the driving force output device 200, the braking device 210, and the steering device 220. The steering wheel 82 is an example of an "controller that receives a steering operation performed by a driver". The controller is not always required to have a ring shape, and may have other shapes for steering, or may be a joystick or a button. A steering grasp sensor 84 is attached to the steering wheel 82. The steering grasp sensor 84 is implemented by, for example, a capacitive sensor, and outputs, to the automatic driving control device 100, a signal that enables detection of whether or not the driver is grasping the steering wheel 82 (in contact with the steering wheel 82 so as to be able to apply a force).

The automatic driving control device 100 includes, for example, a first controller 120 and a second controller 160. The first controller 120 and the second controller 160 are each implemented by a hardware processor such as a CPU (Central Processing Unit) executing a program (software). A part or all of the components may be implemented by hardware (circuit; including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the automatic driving control device 100 such as an HDD or a flash memory, or the program may be stored in a removable storage medium such as a DVD or a CD-ROM. Then, the storage medium (non-transitory storage medium) may be mounted on a drive device so that the program is installed into an HDD or a flash memory of the automatic driving control device 100. The automatic driving control device 100 is an example of "vehicle control device", and a combination of an action plan generator 140 and a second controller 160 is an example of "driving controller".

FIG. 2 is a functional configuration diagram of the first controller 120 and the second controller 160. The first controller 120 includes, for example, a recognizer 130, an action plan generator 140, and a mode determiner 150. The first controller 120 implements, for example, the function of AI (Artificial Intelligence) and the function of a model given in advance in parallel. For example, the function of "recognizing an intersection" may be implemented by executing recognition of an intersection by, for example, deep learning, and recognition based on a condition (including, for example, a signal adapted for pattern matching and a road sign) given in advance in parallel, giving scores to both of the recognitions, and giving an integrated evaluation. The reliability of automatic driving is ensured in this manner.

The recognizer 130 recognizes states such as the position, speed, and acceleration of an object near the host vehicle M based on information input from the camera 10, the radar device 12, and the LIDAR 14 via the object recognition device 16. The position of an object is, for example, recognized as a position in an absolute coordinate system with respect to a representative point (for example, center of gravity or center of drive axis) of the host vehicle M to be used for control. The position of an object may be represented by a representative point such as a center of gravity or corner of the object, or may be represented by a region. The "state" of an object may include the acceleration, jerk, or "action state" (for example, whether or not the host vehicle M is changing a lane or is trying to change a lane) of the object.

The recognizer 130 recognizes, for example, a lane (travel lane) on which the host vehicle M is traveling. For example, the recognizer 130 recognizes the travel lane by comparing a pattern (for example, arrangement of solid lines and broken lines) of a road division line obtained from the second map information 62 with a pattern of a road division line near the host vehicle M recognized from the image photographed by the camera 10, to thereby recognize the travel lane. In addition to the road division line, the recognizer 130 may recognize the travel lane by recognizing a travel path boundary (road boundary) including, for example, a road division line, the shoulder of a road, a curb, a center median, and a guardrail. In particular, in this embodiment, the recognizer 130 recognizes left and right road division lines (hereinafter referred to as "camera road division line") on the lane and the center line (hereinafter referred to as "camera road center line") on the lane based on the image photographed by the camera 10. The camera road center line is recognized as the center line of the left and right camera road division lines. In this recognition, the position of the host vehicle M acquired from the navigation device 50 or the result of processing by the INS may be considered. The recognizer 130 recognizes a stop line, an obstacle, red light, a toll gate, and other road events.

The recognizer 130 recognizes the position or posture of the host vehicle M with respect to a travel lane when recognizing the travel lane. The recognizer 130 may recognize, for example, as the relative position and posture of the host vehicle M with respect to the travel lane, a deviation of the reference point of the host vehicle M from the center of the lane and an angle with respect to a line obtained by connecting the centers of the lane in the travel direction of the host vehicle M. Instead, the recognizer 130 may recognize, for example, the position of the reference point of the host vehicle M with respect to any side edge (road division line or road boundary) of the travel lane as the relative position of the host vehicle M with respect to the travel lane.

The action plan generator 140 generates a target trajectory in which the host vehicle M is to travel in the future (without depending on an operation performed by the driver) automatically so as to be capable of traveling on a recommended lane determined by the recommended lane determiner 61 in principle and coping with the surrounding situation of the host vehicle M. The target trajectory includes, for example, a speed component. For example, the target trajectory is represented by arranging the locations (trajectory points) to be reached by the host vehicle M. The trajectory points are locations to be reached by the host vehicle M at predetermined travelled distances (for example, about several meters) along the road. In addition, a target speed and a target acceleration are generated in each predetermined sampling period (for example, less than 1 second) as a part of the target trajectory. The trajectory points may be positions to be reached by the host vehicle M in each sampling period. In this case, information on the target speed and the target acceleration is represented by an interval between trajectory points.

The action plan generator 140 may set an automatic driving event when generating a target trajectory. The automatic driving event includes, for example, a constant speed traveling event, a low-speed following traveling event, a lane change event, a junction event, a merge event, and a takeover event. The action plan generator 140 generates a target trajectory that depends on an activated event.

The mode determiner 150 determines a driving mode of the host vehicle M as any one of a plurality of driving modes imposing different tasks on the driver. The mode determiner 150 includes, for example, a driver state determiner 152, a mode change processor 154, and a determiner 156. The functions of these components are described later.

FIG. 3 is a diagram illustrating an example of a correspondence relationship among a driving mode, a control state of the host vehicle M, and a task. The driving mode of the host vehicle M includes, for example, five modes, namely, a mode A to a mode E. The control state, namely, the degree of automatic driving control of the host vehicle M is the highest for the mode A, and the degree of automatic driving control decreases in order of the mode B, the mode C, the mode D, and the mode E. In contrast, the degree of a task imposed on a driver is the smallest for the mode A, and increases in order of the mode B, the mode C, the mode D, and the mode E. The mode D or the mode E is a control state that is not automatic driving, and thus the automatic driving control device 100 has a responsibility to finish control relating to automatic driving, and cause the driving mode to transition to driving assistance or manual driving. Now, examples of details of the respective driving modes are given in the following.

The mode A relates to the state of automatic driving, and the driver does not bear any one of the tasks of monitoring the front field of view and grasping the steering wheel 82. However, even in the mode A, the driver is required to have a posture of being able to immediately transition to manual driving in response to a request from a system, which is mainly the automatic driving control device 100. The automatic driving indicates that both of steering and acceleration/deceleration are controlled irrespective of an operation of the driver. The front field of view means a space in the travel direction of the host vehicle M visually recognized through a front wind shield. The mode A is a driving mode that can be executed, for example, when the host vehicle M is traveling at a speed equal to or lower than the upper limit vehicle speed (for example, about 50 [km/h]) on an expressway such as a highway, and there is a preceding vehicle for the host vehicle M to follow, which is sometimes referred to as TJP (Traffic Jam Pilot). When this condition is not satisfied, the mode determiner 150 changes the driving mode of the host vehicle M to the mode B.

The mode B relates to the state of driving assistance, and the driver bears the task of monitoring the front field of view of the host vehicle M, but does not have the task of grasping the steering wheel 82. The mode C relates to the state of driving assistance, and the driver bears the task of monitoring the front field of view, and the task of grasping the steering wheel 82. The mode D is a driving mode in which the driver is required to perform a certain degree of operation for at least one of steering and acceleration/deceleration of the host vehicle M. For example, in the mode D, driving assistance such as ACC (Adaptive Cruise Control) or LKAS (Lane Keeping Assist System) is performed. The mode E refers to the state of manual driving in which the driver is required to perform a driving operation for both of steering and acceleration/deceleration. In both of the mode D and the mode E, the driver naturally bears the task of monitoring the front field of view of the host vehicle M.

The automatic driving control device 100 (and driving assistance device (not shown)) executes automatic lane change that depends on the driving mode. The automatic lane change includes an automatic lane change (1) required by the system and an automatic lane change (2) required by the driver. The automatic lane change (1) includes an automatic lane change for passing a preceding vehicle, which is performed when the vehicle speed of the preceding vehicle is lower than the vehicle speed of the host vehicle by a reference amount or more, and an automatic lane change (automatic lane change caused by change of recommended lane) for traveling toward the destination. The automatic lane change (2) is to change the lane of the host vehicle M toward an operation direction when the driver has operated a blinker in a case where, for example, a condition on the vehicle speed or a positional relationship with a nearby vehicle is satisfied.

In the mode A, the automatic driving control device 100 does not execute any one of the automatic lane change (1) and the automatic lane change (2). In the mode B and the mode C, the automatic driving control device 100 executes both of the automatic lane change (1) and the automatic lane change (2). In the mode D, the driving assistance device (not shown) does not execute the automatic lane change (1) but executes the automatic lane change (2). In the mode E, both of the automatic lane change (1) and the automatic lane change (2) are not executed.

When the task of the determined driving mode (hereinafter referred to as "current driving mode") is not performed by the driver, the mode determiner 150 changes the driving mode of the host vehicle M to a driving mode that imposes a heavier task.

For example, when the driver is in a posture of not being able to transition to manual driving in response to a request from the system in the mode A (for example, when the driver is continuously looking aside or when a sign that indicates a difficulty in driving is detected), the mode determiner 150 uses the HMI 30 to prompt the driver to transition to manual driving, and when the driver does not respond, the mode determiner 150 performs control of causing the host vehicle M to gradually stop at the shoulder of the road and stopping automatic driving. After automatic driving is stopped, the host vehicle M is set to the state of the mode D or the mode E, and the host vehicle M can be caused to start by a manual operation performed by the driver. The following description holds true for the case of "stopping automatic driving". When the driver is not monitoring the front field of view in the mode B, the mode determiner 150 uses the HMI 30 to prompt the driver to monitor the front field of view, and when the driver does not respond, the mode determiner 150 performs control of causing the host vehicle M to gradually stop at the shoulder of the road and stopping automatic driving. When the driver is not monitoring the front field of view or is not grasping the steering wheel 82 in the mode C, the mode determiner 150 uses the HMI 30 to prompt the driver to monitor the front field of view and/or to grasp the steering wheel 82, and when the driver does not respond, the mode determiner 150 performs control of causing the host vehicle M to gradually stop at the shoulder of the road and stopping automatic driving.

The driver state determiner 152 monitors the state of the driver and determines whether the state of the driver is a state that depends on a task in order to perform the mode change described above. For example, the driver state determiner 152 analyzes an image photographed by the driver monitor camera 70 to perform posture estimation processing, and determines whether the driver is in a posture of not being able to transition to manual driving in response to a request from the system. The driver state determiner 152 analyzes the image photographed by the driver monitor camera 70 to perform line-of-sight estimation processing, and determines whether or not the driver is monitoring the front field of view.

The mode change processor 154 performs various kinds of processing for changing the mode. For example, the mode change processor 154 instructs the action plan generator 140 to generate a target trajectory for stopping at the shoulder, gives an activation instruction to the driving assistance device (not shown), or controls the HMI 30 to cause the driver to perform an action. The operation of the determiner 156 is described later.

The second controller 160 controls the driving force output device 200, the braking device 210, and the steering device 220 so that the host vehicle M passes through the target trajectory generated by the action plan generator 140 as scheduled.

Referring back to FIG. 2, the second controller 160 includes, for example, an acquirer 162, a speed controller 164, and a steering controller 166. The acquirer 162 acquires information on a target trajectory (trajectory points) generated by the action plan generator 140, and stores the information into a memory (not shown). The speed controller 164 controls the driving force output device 200 or the braking device 210 based on a speed component accompanying the target trajectory stored in the memory. The steering controller 166 controls the steering device 220 depending on the degree of curve of the target trajectory stored in the memory. The processing of the speed controller 164 and the steering controller 166 is implemented by a combination of feed-forward control and feedback control. As an example, the steering controller 166 executes feed-forward control that depends on the curvature of the road in front of the host vehicle M and feedback control based on a deviation from the target trajectory.

The driving force output device 200 outputs, to a drive wheel, a traveling driving force (torque) for causing the host vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the second controller 160 or information input from the driving controller 80.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the second controller 160 or information input from the driving controller 80, and causes a brake torque that depends on a braking operation to be output to each wheel. The braking device 210 may include, as a backup, a mechanism for transmitting the hydraulic pressure, which is caused by an operation of the brake pedal included in the driving controller 80, to the cylinder via a master cylinder. The configuration of the braking device 210 is not limited to the configuration described above, and the braking device 210 may be an electronic hydraulic brake device configured to control an actuator in accordance with information input from the second controller 160, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the second controller 160 or information input from the driving controller 80 to change the orientation of the steered wheel.

[Operation of Vehicle Control Device]

Figure 4:
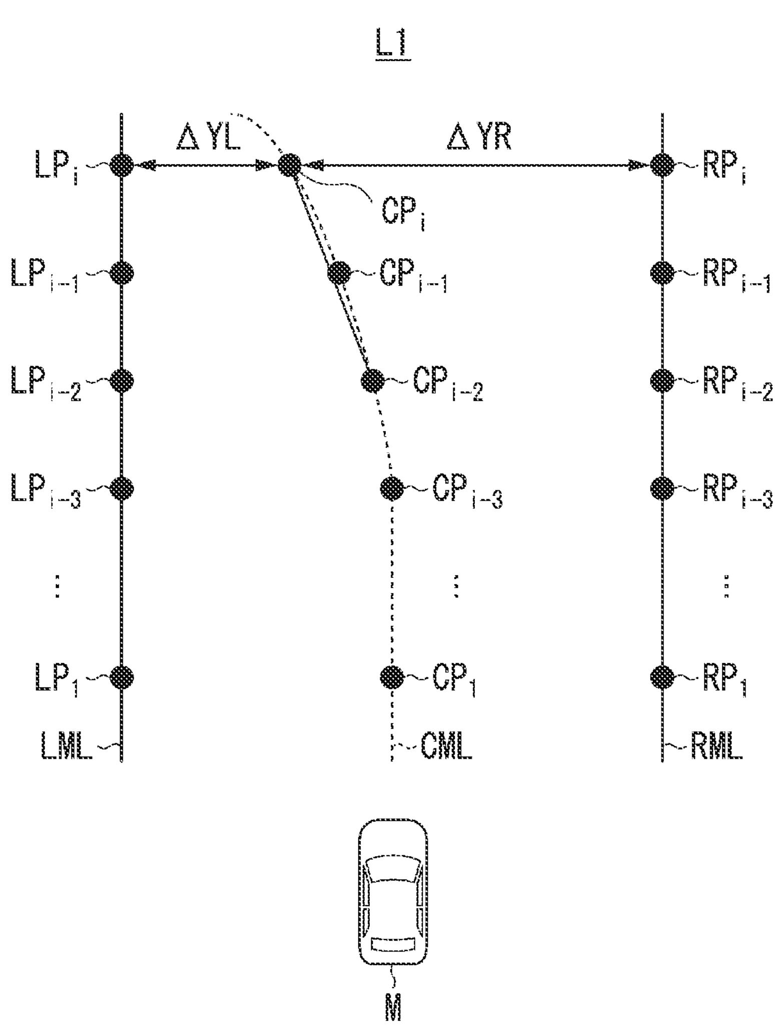
FIG. 4 is a diagram illustrating an example of a scene in which the operation of the vehicle control device according to an embodiment is executed.

Next, description is given of operation of a vehicle control device according to an embodiment. FIG. 4 is a diagram illustrating an example of a scene in which the operation of the vehicle control device according to an embodiment is executed. In FIG. 4, it is assumed that the driving mode of the host vehicle M is the mode B, and the host vehicle M is traveling on a lane L1 referring to the map road center line included in the second map information 62 as a reference line (in other words, along the map road center line). In FIG. 4, the reference symbol LML indicates a left-side map road division line, the reference symbol RML indicates a right-side map road division line, and the reference symbol CML indicates a map road center line. The left-side map road division line LML, the right-side map road division line RML, and the map road center line CML are stored in the second map information 62 in advance.

As illustrated in FIG. 4, each of the left-side map road division line LML, the right-side map road division line RML, and the map road center line CML is represented as a point cloud in which points are arranged at predetermined intervals (for example, 1m). In FIG. 4, the reference symbol LP represents a point cloud of the left-side map road division line LML, the reference symbol RP represents a point cloud of the right-side map road division line RML, and the reference symbol CP represents a point cloud of the map road center line CML. The determiner 156 extracts, from the second map information 62, the point clouds LP, RP, and CP of a predetermined range (for example, range of several seconds ahead to several tens of meters ahead based on the speed of the host vehicle M at the current point) in the forward region of the host vehicle M on the travel lane. In the situation illustrated in FIG. 4, it is assumed that the point clouds $LP_1$ to $LP_i$, $RP_1$ to $RP_i$, $CP_1$ to $CP_i$ are extracted from the forward region of the host vehicle M on the travel lane.

Figure 5:
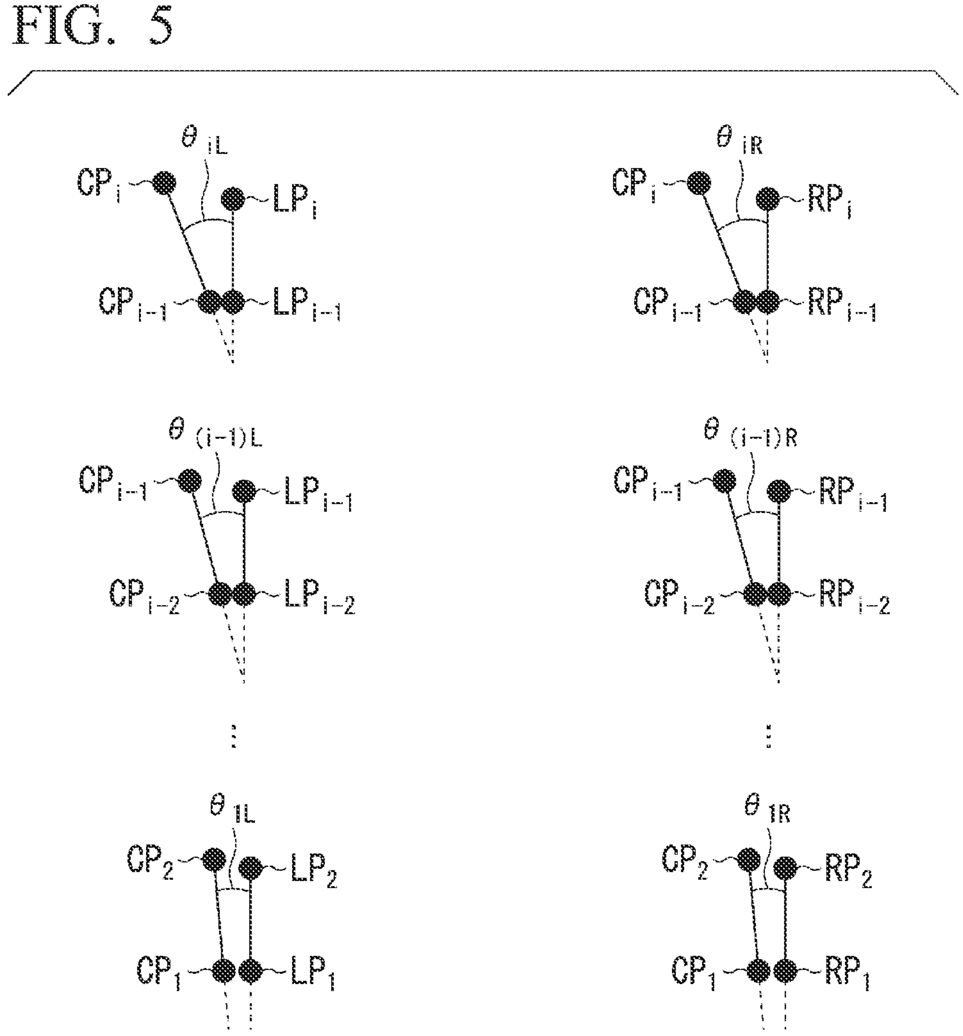
FIG. 5 is a diagram for describing processing to be executed by a determiner.

FIG. 5 is a diagram for describing processing to be executed by the determiner 156. The determiner 156 first calculates, for the left-side map road division line LML, angles $\theta_{kL}$ (k=1~i) between straight lines connecting between a point $LP_k$ and points $LP_{k+1}$ (k=1~i) and straight lines connecting between a point $CP_k$ and points $CP_{k+1}$ (k=1~i). Similarly, the determiner 156 calculates, for the right-side map road division line RML, angles $\theta_{kR}$ (k=1~i) between straight lines connecting between a point $RP_k$ and points $RP_{k+1}$ (k=1~i) and straight lines connecting between a point $CP_k$ and points $CP_{k+1}$ (k=1~i). That is, the angles $\theta_{kL}$ (k=1~i) represent the degree of angle deviation based on the point cloud between the left-side map road division line LML and the map road center line CML, and the angles $\theta_{kR}$ (k=1~i) represent the degree of angle deviation based on the point cloud between the right-side map road division line RML and the map road center line CML. In this embodiment, as an example, straight lines are derived to calculate angles for two points, but for example, straight lines may be derived by fitting for three or more points in the point cloud to derive the angles.

The determiner 156 next calculates each of an average value $\theta_{avL}$ of the angles $\theta_{kL}$ (k=1~i) calculated for the left-side map road division line LML, and an average value $\theta_{avR}$ of the angles $\theta_{kR}$ (k=1~i) calculated for the right-side map road division line RML. The determiner 156 calculates an angular sum $\Delta\theta$ of the calculated average values $\theta_{avL}$ and $\theta_{avR}$. The angular sum $\Delta\theta$ is an example of "determination angle, which is based on an angle between a map road division line and a map road center line". That is, the angular sum $\Delta\theta$ is an indicator value indicating the degree of deviation between the left and right map road division lines LML and RML and the map road center line MCL. The angular sum $\Delta\theta$ is defined as a sum of the average value $\theta_{avL}$ calculated based on the point cloud LP and the average value $\theta_{avR}$ calculated based on the point cloud RP, and thus it is possible to accurately represent the degree of angle deviation between the map road division line and the map road center line by excluding the influence of an outlier.

The determiner 156 further extracts an angle peak value (maximum value) $\theta_{L\_peak}$ among the angles $\theta_{kL}$ (k=1~i) calculated for the left-side map road division line LML, and extracts an angle peak value $\theta_{R\_peak}$ among the angles $\theta_{kR}$ (k=1~i) calculated for the right-side map road division line RML. The angle peak values $\theta_{L\_peak}$ and $\theta_{R\_peak}$ are also examples of "determination angle, which is based on an angle between a map road division line and a map road center line". In this embodiment, the angular sum $\Delta\theta$ and the angle peak values $\theta_{L\_peak}$ and $\theta_{R\_peak}$ are defined as "determination angle, which is based on an angle between a map road division line and a map road center line", but more in general, it suffices that the determination angle be an indicator value indicating the degree of angle deviation obtained by subjecting the map road division line and the map road center line to predetermined processing.

The determiner 156 next calculates a left-side distance $\Delta YL$ between the left-side map road division line LML and the map road center line CML, and a right-side distance $\Delta YR$ between the right-side map road division line RML and the map road center line CML. More specifically, for example, the determiner 156 calculates $\Delta YL=\min(dis|LP_k-CP_k|)$ (k=1~i, dis represents a distance between $LP_k$ and $CP_k$) based on the point cloud $LP_k$ (k=1~i) constituting the left-side map road division line LML. Further, for example, the determiner 156 calculates $\Delta YR=\min(dis|RP_k-RP_k|)$ (k=1~i, dis represents a distance between $RP_k$ and $CP_k$) based on the point cloud $RP_k$ (k=1~i) constituting the right-side map road division line RML. The left-side distance $\Delta YL$ or the right-side distance $\Delta YR$ is an example of "determination distance, which is based on a distance between the map road division line and the map road center line". More in general, it suffices that the determination distance be an indicator value indicating the degree of distance deviation obtained by subjecting the map road division line and the map road center line to predetermined processing.

[First Determination]

The determiner 156 executes the following determination processing after calculating the angular the angular sum $\Delta\theta$, the angle peak values $\theta_{L\_peak}$ and $\theta_{R\_peak}$, and the left-side distance $\Delta YL$ and the right-side distance $\Delta YR$. First, the determiner 156 determines whether or not the angular sum $\Delta\theta$ is equal to or larger than a first angle threshold value ThA_1 (first determination). That is, the first determination is processing for determining whether the degree of angle deviation between the map road division line ML and the map road center line CML is large or not. The first angle threshold value ThA_1 is an example of "first threshold value".

[Second Determination]

The determiner 156 further determines whether or not the angle peak value $\theta_{L\_peak}$ is equal to or larger than a second angle threshold value ThA_2 and the left-side distance $\Delta YL$ is equal to or larger than a distance threshold value ThD (2-1th determination), and determines whether or not the angle peak value $\theta_{R\_peak}$ is equal to or larger than the second angle threshold value ThA_2 and the right-side distance $\Delta YR$ is equal to or larger than the distance threshold value ThD (2-2th determination). The 2-1th determination is processing for determining whether or not the left-side map road division line LML and the map road center line CML deviate from each other, and the 2-2th determination is processing for determining whether or not the right-side map road division line RML and the map road center line CML deviate from each other. Next, the determiner 156 determines whether or not at least one of the 2-1th determination and the 2-2th determination results in an affirmative result (second determination). That is, the second determination is processing for determining whether or not at least one of the left-side map road division line LML and the right-side map road division line RML deviates from the map road center line CML. The second angle threshold value ThA_2 is an example of "first threshold value", and the distance threshold value ThD is an example of "second threshold value".

Determination relating to the angle peak values $\theta_{L\_peak}$ and $\theta_{R\_peak}$ may be omitted from the second determination. In that case, the second determination involves determining whether or not the left-side distance $\Delta YL$ is equal to or larger than the distance threshold value ThD or the right-side distance $\Delta YR$ is equal to or larger than the distance threshold value ThD.

[Third Determination]

The determiner 156 further determines, on the basis of the second map information 62, whether or not there is a predetermined region within a predetermined range (for example, as described above, range of several seconds ahead to several tens of meters ahead based on the speed of the host vehicle M at the current point) in the forward region of the host vehicle M on the travel lane. The predetermined region is defined as, for example, a lane increase section, a lane decrease section, or a section where the curvature of the road is equal to or larger than a certain value. When there is a predetermined region in front of the host vehicle M, execution of a lane change or stop of LKAS is conceivable in the near future, and thus change of the driving mode described later is not appropriate in some cases. The third determination is processing for checking whether or not the forward region of the host vehicle M does not correspond to the predetermined region and change of the driving mode described later is allowed.

[Composite Determination]

The determiner 156 next determines whether or not all of the first determination, the second determination, and the third determination result in affirmative results. When the determiner 156 has determined that all of the first determination, the second determination, and the third determination result in affirmative results, this means that distortion occurs in the map road center line CML, and the driving mode of the mode B referring to the second map information 62 (that is, driving mode of mode B referring to map road center line CML included in second map information 62 as reference line) is required to be changed. That is, as described below, the mode determiner 150 changes the driving mode of the mode B referring to the second map information 62 according to the result of determination by the determiner 156. In this manner, the first determination, the second determination, and the third determination are executed referring to only the second map information 62, and thus it possible to detect distortion of the map road center line CML with a simple method without depending on other information.

[Change of Driving Mode]

When the determiner 156 has determined that all of the first determination, the second determination, and the third determination result in affirmative results, the mode determiner 150 determines the driving mode to change to on the basis of a magnitude relationship between at least one of the angle peak values $\theta_{L\_peak}$ and $\theta_{R\_peak}$ and a plurality of threshold values. The phrase "at least one of the angle peak values $\theta_{L\_peak}$ and $\theta_{R\_peak}$" means an angle peak value of at least one of the 2-1th determination and the 2-2th determination in which affirmative results are obtained. In the following description, for the sake of simplicity of description, it is assumed that an affirmative result is obtained for only the 2-1th determination (that is, angle peak value $\theta_{L\_peak}$), but when affirmative results are obtained for both of the 2-1th determination and the 2-2th determination, the following determination processing is executed for both of the angle peak values $\theta_{L\_peak}$ and $\theta_{R\_peak}$.

The mode determiner 150 determines whether or not the angular sum $\Delta\theta$ is equal to or larger than the first angle threshold value ThA_1 and smaller than a third angle threshold value ThA_3, and the angle peak value $\theta_{L\_peak}$ is equal to or larger than the second angle threshold value ThA_2 and smaller than a fourth angle threshold value ThA_4. When the mode determiner 150 has determined that the angular sum $\Delta\theta$ is equal to or larger than the first angle threshold value ThA_1 and smaller than the third angle threshold value ThA_3, and the angle peak value $\theta_{L\_peak}$ is equal to or larger than the second angle threshold value ThA_2 and smaller than the fourth angle threshold value ThA_4, the mode determiner 150 next determines whether or not the map road division line ML and the camera road division line CL match each other for at least a part thereof.

To determine whether or not the map road division line ML and the camera road division line CL match each other for at least a part thereof, for example, the mode determiner 150 first determines whether or not a distance between the camera road division line CL and the map road division line ML is equal to or smaller than a threshold value for each of the camera road division line CL and map road division line ML on the left side and the camera road division line CL and map road division line ML on the right side. The determiner 156 determines that the camera road division line CL and the map road division line ML match each other for at least a part thereof when the distance between the camera road division line CL and the map road division line ML is equal to or smaller than the threshold value for at least one of the left side and the right side. Further, for example, the mode determiner 150 determines whether or not an angle between the camera road division line CL and the map road division line ML is equal to or smaller than a threshold value for each of the camera road division line CL and map road division line ML on the left side and the camera road division line CL and map road division line ML on the right side, and may determine that the camera road division line CL and the map road division line ML match each other for at least a part thereof when the angle between the camera road division line CL and the map road division line ML is equal to or smaller than the threshold value for at least one of the left side and the right side. Further, for example, when the camera road division line CL is lost (that is, has disappeared), the mode determiner 150 may determine that the lost camera road division line CL does not match the map road division line ML.

Figure 6:
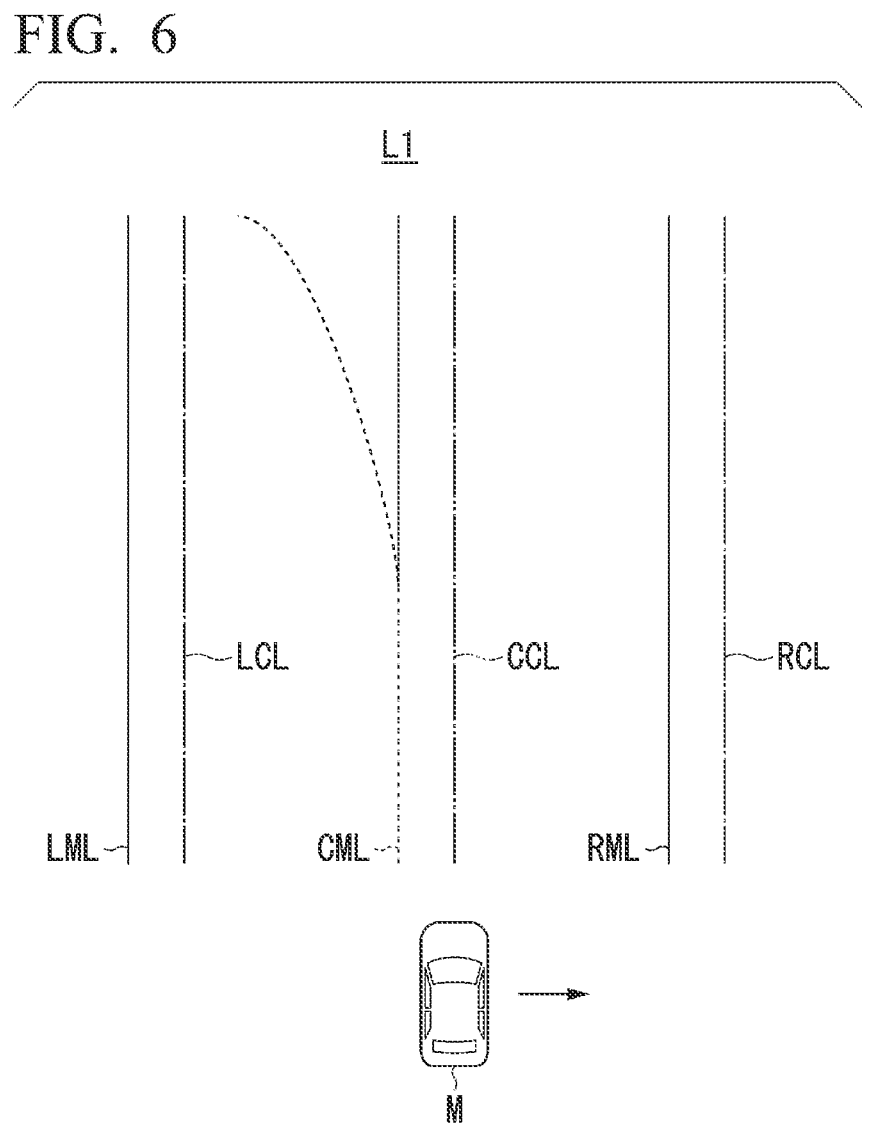

FIG. 6 is a diagram illustrating an example of mode change processing to be executed by the mode determiner 150. In FIG. 6, the reference symbol LCL represents a left-side camera road division line, the reference symbol RCL represents a right-side camera road division line, and the reference symbol CCL represents a camera road center line. When it is determined that the map road division line ML and the camera road division line CL match each other for at least a part thereof, the mode determiner 150 changes the driving mode of the mode B referring to the second map information 62 to the driving mode of the mode B referring to the camera image information (that is, driving mode of mode B referring to camera road center line CCL as reference line). On the other hand, when it is determined that the map road division line ML and the camera road division line CL do not match each other for at least a part thereof, the mode determiner 150 changes the driving mode of the mode B referring to the second map information 62 to the driving mode of the mode C referring to the camera image information (that is, driving mode of mode C referring to camera road center line CCL as reference line).

As illustrated in FIG. 6, when the driving mode is changed to the driving mode of the mode B or the mode C referring to the camera road center line CCL as a reference line, the action plan generator 140 generates a target trajectory such that the host vehicle M travels along the camera road center line CCL, and the second controller 160 causes the vehicle M to travel along the generated target trajectory. That is, it is possible to appropriately execute driving control referring to the center line of the travel lane by causing the host vehicle M to travel along the camera road center line CCL instead of the map road center line CML determined to have a distortion.

After the mode determiner 150 has changed the driving mode of the mode B referring to the map road center line CML as a reference line to the driving mode of the mode B or the mode C referring to the camera road center line CCL as a reference line, the mode determiner 150 continues the driving mode of the mode B or the mode C for at least a first predetermined period. This is because if the driving mode is returned to the driving mode of the mode B referring to the map road center line CML as a reference line immediately after distortion of the map road center line CML is resolved, hunting may occur in the driving mode and the occupant of the host vehicle M may feel uncomfortable.

Thus, after the mode determiner 150 has continued the driving mode of the mode B or the mode C referring to the camera road center line CCL for the first predetermined period, the determiner 156 executes the first determination relating to the angle deviation of the map road center line CML and the second determination relating to the distance deviation of the camera road center line CCL again. When it is determined that the angular sum $\Delta\theta$ is smaller than the first angle threshold value ThA_1, the left-side distance $\Delta YL$ is smaller than the distance threshold value ThD, and the right-side distance $\Delta YR$ is smaller than the distance threshold value ThD, the mode determiner 150 returns the driving mode of the mode B or the mode C referring to the camera road center line CCL as a reference line to the driving mode of the mode B referring to the map road center line CML as a reference line.

Further, the mode determiner 150 executes the first determination and the second determination again when a second predetermined period, which is longer than the first predetermined period, has elapsed since the mode determiner 150 changed the driving mode of the mode B referring to the map road center line CML to the driving mode of the mode B or the mode C referring to the camera road center line CCL as a reference line. When it is determined that the angular sum $\Delta\theta$ is equal to or larger than the first angle threshold value ThA_1, or the left-side distance $\Delta YL$ is equal to or larger than the distance threshold value ThD, or the right-side distance $\Delta YR$ is equal to or larger than the distance threshold value ThD, the mode determiner 150 changes the driving mode of the mode B or the mode C referring to the camera road center line CCL as a reference line to the driving mode of the mode D or the mode E (manual driving). That is, it is possible to execute driving control more appropriate for the situation by changing the driving mode to a driving mode imposing a heavier task when a period in which the map road center line CML is estimated to have a distortion continues for a long period.

On the other hand, when it is determined that the angular sum $\Delta\theta$ is equal to or larger than the third angle threshold value ThA_3 and the angle peak value $\theta_{L\_peak}$ is equal to or larger than the fourth angle threshold value ThA_4, the mode determiner 150 changes the driving mode of the mode B referring to the map road center line CML as a reference line to the driving mode of the mode C referring to the camera road center line CCL as a reference line. That is, in this case, the camera road center line CCL is assumed to have a larger distortion, and thus the mode determiner 150 changes (drops) the driving mode of the mode B referring to the map road center line CML as a reference line to the driving mode of the mode C referring to the camera road center line CCL as a reference line without changing it to the driving mode of the mode B referring to the camera road center line CCL as a reference line.

Also in this case, the mode determiner 150 executes the first determination relating to the angle deviation of the map road center line CML and the second determination relating to the distance deviation of the camera road center line CCL again after the mode determiner 150 has continued the driving mode of the mode C referring to the camera road center line CCL as a reference line for the first predetermined period. When it is determined that the angular sum $\Delta\theta$ is smaller than the first angle threshold value ThA_1, the left-side distance $\Delta YL$ is smaller than the distance threshold value ThD, and the right-side distance $\Delta YR$ is smaller than the distance threshold value ThD, the mode determiner 150 returns the driving mode of the mode C referring to the camera road center line CCL as a reference line to the driving mode of the mode B referring to the map road center line CML as a reference line.

Similarly, the mode determiner 150 executes the first determination and the second determination again when the second predetermined period has elapsed since the mode determiner 150 changed the driving mode of the mode B referring to the map road center line CML to the driving mode of the mode C referring to the camera road center line CCL as a reference line. The mode determiner 150 changes the driving mode of the mode C referring to the camera road center line CCL as a reference line to the driving mode of the mode D or the mode E when it is determined that the angular sum $\Delta\theta$ is equal to or larger than the first angle threshold value ThA_1, or the left-side distance $\Delta YL$ is equal to or larger than the distance threshold value ThD, or the right-side distance $\Delta YR$ is equal to or larger than the distance threshold value ThD.

In the description given above, the first predetermined period and the second predetermined period used for determination may be continuous distances travelled by the host vehicle M. For example, after changing the driving mode of the mode B referring to the map road center line CML as a reference line to the driving mode of the mode B or the mode C referring to the camera road center line CCL as a reference line, the mode determiner 150 may cause the host vehicle M to continue the driving mode of the mode B or the mode C until the host vehicle M has traveled continuously by the first predetermined distance, and then execute the above-mentioned determination processing for returning to the original driving mode. Further, for example, after changing the driving mode of the mode B referring to the map road center line CML as a reference line to the driving mode of the mode B or the mode C referring to the camera road center line CCL as a reference line, the mode determiner 150 may cause the host vehicle M to travel by the second predetermined distance, which is longer than the first predetermined distance, and then execute processing for determining whether or not to drop the driving mode to the mode D or the mode E.

Further, in the description given above, the determiner 156 acquires a point cloud in a predetermined range from the second map information 62, and calculates the angular sum $\Delta\theta$ and the angle peak value based on the acquired point cloud. At this time, the determiner 156 may count the number of points of the acquired point cloud, and calculate the angular sum $\Delta\theta$ and the angle peak value and perform determination processing only when the counted number of points is equal to or larger than a predetermined value. When the counted number of points is smaller than the predetermined value, the mode determiner 150 may change the driving mode of the mode B referring to the map road center line CML as a reference line to the driving mode of the mode B or the mode C referring to the camera road center line CCL as a reference line or drop the driving mode to the mode D or the mode E.

Figure 8:
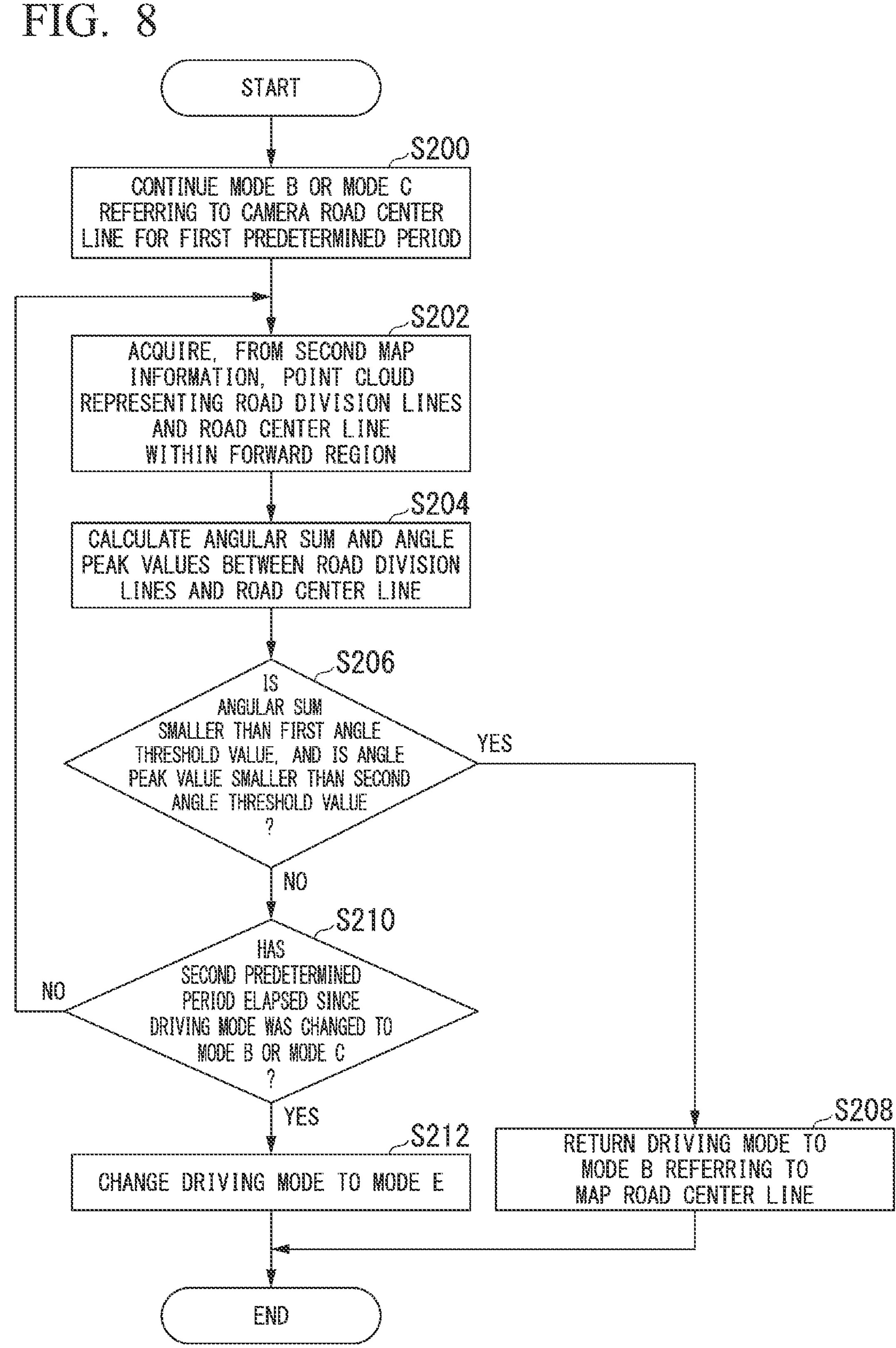
FIG. 8 is a flow chart illustrating another example of processing to be executed by the vehicle control device according to an embodiment.

Next, description is given of a flow of processing to be executed by the vehicle control device according to an embodiment with reference to FIG. 7 and FIG. 8. FIG. 7 is a flow chart illustrating an example of processing to be executed by the vehicle control device according to an embodiment. The processing illustrated in FIG. 7 is executed repeatedly while the host vehicle M is traveling in the driving mode of the mode B referring to the map road center line CCL as a reference line.

First, the determiner 156 acquires, from the second map information 62, a point cloud representing road division lines and a road center line in a predetermined range within a forward region on the travel lane of the host vehicle M (step S100). Next, the determiner 156 calculates, on the basis of the acquired point cloud, the angular sum $\Delta\theta$, the angle peak values $\theta_{L\_peak}$ and $\theta_{R\_peak}$, and lateral distances $\Delta$YL and $\Delta$YR between the map road division lines and the map road center line (Step S102).

Next, the determiner 156 executes first determination based on the calculated angular sum $\Delta\theta$, executes second determination based on the angle peak values $\theta_{L\_peak}$ and $\theta_{R\_peak}$ and the lateral distances $\Delta$YL and $\Delta$YR (Step S104). Next, the determiner 156 determines whether or not affirmative results are obtained for all of the first determination, the second determination, and the third determination (Step S106). When affirmative results are not obtained for all of the first determination, the second determination, and the third determination, the determiner 156 returns the processing to Step S100.

When affirmative results are obtained for all of the first determination, the second determination, and the third determination, the mode determiner 150 determines whether or not the calculated angular sum is equal to or larger than the first angle threshold value ThA_1 and smaller than the third angle threshold value ThA_3, and the calculated angle peak value is equal to or larger than the second angle threshold value ThA_2 and smaller than the fourth angle threshold value ThA_4 (Step S108). When it is determined that the calculated angular sum is equal to or larger than the first angle threshold value ThA_1 and smaller than the third angle threshold value ThA_3, and the calculated angle peak value is equal to or larger than the second angle threshold value ThA_2 and smaller than the fourth angle threshold value ThA_4, the mode determiner 150 next determines whether or not the camera road division line and the map road division line match each other for at least a part thereof (Step S110).

When it is determined that the camera road division line and the map road division line match each other for at least a part thereof, the mode determiner 150 changes the driving mode of the mode B referring to the map road center line CML to the driving mode of the mode B referring to the camera road center line CCL (Step S112). On the other hand, when it is determined that the angular sum calculated in Step S108 is equal to or larger than the first angle threshold value ThA_1 and smaller than the third angle threshold value ThA_3, and the calculated angle peak value is equal to or larger than the second angle threshold value ThA_2 and smaller than the fourth angle threshold value ThA_4, or it is determined that the camera road division line and the map road division line do not match each other in Step S110, the mode determiner 150 changes the driving mode of the mode B referring to the map road center line CML to the driving mode of the mode C referring to the camera road center line CCL (Step S114). Then, the processing of this flow chart is finished.

Further, in the processing of the flow chart, the processing of Step S110 may be omitted, and in that case, the processing of Step S112 is executed when an affirmative result is obtained in Step S108.

Further, in the description given above, when a negative determination is made in Step S108 or Step S110, the mode determiner 150 changes the driving mode of the mode B referring to the map road center line CML to the driving mode of the mode C referring to the camera road center line CCL in Step S114. However, the present invention is not limited to such a configuration, and even when a negative determination is made in Step S108 or Step S110, the mode determiner 150 may continue the driving mode of the mode B referring to the travel trajectory of a preceding vehicle as a reference line when there is a preceding vehicle within a predetermined distance in the travel direction of the host vehicle M. Further, for example, the mode determiner 150 may further calculate the center line between the travel trajectory of the preceding vehicle and the camera road center line CCL, and continue the driving mode of the mode B referring to the calculated center line as a reference line.

FIG. 8 is a flow chart illustrating another example of processing to be executed by the vehicle control device according to an embodiment. The flow chart illustrated in FIG. 8 is executed after the processing Step S112 or Step S114 illustrated in FIG. 7 is executed.

First, the mode determiner 150 continues the driving mode of the mode B or the mode C referring to the camera road center line CCL for the first predetermined period (Step S200). Next, similarly to Step S100, the determiner 156 acquires, from the second map information 62, a point cloud representing road division lines and a road center line in a predetermined range within a forward region on the travel lane of the host vehicle M (step S202). Next, the determiner 156 calculates, on the basis of the acquired point cloud, the angular sum $\Delta\theta$ and the angle peak values $\theta_{L\_peak}$ and OR peak between the map road division lines and the map road center line (Step S204).

Next, the mode determiner 150 determines whether or not the angular sum $\Delta\theta$ is smaller than the first angle threshold value ThA_1 and the calculated angle peak values $\theta_{L\_peak}$ and $\theta_{R\_peak}$ are smaller than the second angle threshold value ThA_2 (Step S206). When it is determined that the angular sum $\Delta\theta$ is smaller than the first angle threshold value ThA_1 and the angle peak values $\theta_{L\_peak}$ and OR peak are smaller than the second angle threshold value ThA_2, the mode determiner 150 returns the driving mode of the mode B or the mode C referring to the camera road center line CCL to the driving mode of the mode B referring to the map road center line CML (Step S208).

On the other hand, when it is not determined that the angular sum $\Delta\theta$ is smaller than the first angle threshold value ThA_1 and the angle peak values $\theta_{L\_peak}$ and $\theta_{R\_peak}$ are smaller than the second angle threshold value ThA_2, the mode determiner 150 next determines whether or not the second predetermined period has elapsed since the driving mode was changed to the mode B or the mode C referring to the camera road center line (Step S210). When it is determined that the second predetermined period has not elapsed, the mode determiner 150 returns the processing to Step S202. On the other hand, when it is determined that the second predetermined period has elapsed, the mode determiner 150 changes the driving mode to the mode E, that is, manual driving (Step S310). Then, the processing of this flow chart is finished.

According to the embodiment described above, when distortion of the map road center line CML is detected by composite determination including the first determination, the second determination, and the third determination while the host vehicle M is traveling in the driving mode of the mode B referring to the map road center line MCL, the driving mode of the mode B referring to the map road center line CML is changed to the driving mode of the mode B or the mode C referring to the camera road center line CCL. As a result, it is possible to appropriately execute driving control referring to the center line of the travel lane.

The embodiment described above can be represented in the following manner.

A vehicle control device comprising a storage medium storing computer-readable commands, and a processor connected to the storage medium, the processor being configured to execute the computer-readable commands to: recognize a surrounding situation of a vehicle; control steering and acceleration/deceleration of the vehicle based on the recognized surrounding situation and map information without depending on an operation performed by a driver of the vehicle; determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver; change the driving mode of the vehicle to a driving mode imposing a heavier task when the task of the determined driving mode is not performed by the driver; determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to the camera road division line included in the surrounding situation when it is determined that the determination angle is equal to or larger than the first threshold value, the determination distance is equal to or larger than the second threshold value, and the forward region of the vehicle does not correspond to the predetermined region.

This concludes the description of the embodiment for carrying out the present invention. The present invention is not limited to the embodiment in any manner, and various kinds of modifications and replacements can be made within a range that does not depart from the gist of the present invention.

What is claimed is:

1. A vehicle control device comprising a storage medium storing computer-readable commands, and a processor connected to the storage medium, the processor being configured to execute the computer-readable commands to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to a camera road division line included in the surrounding situation when it is determined that the determination angle is equal to or larger than the first threshold value, the determination distance is equal to or larger than the second threshold value, and the forward region of the vehicle does not correspond to the predetermined region, wherein the processor defines the determination angle as a sum of an average value of the map road division line on a left side and the map road center line and an average value of the map road division line on a right side and the map road center line.

2. The vehicle control device according to claim 1, wherein the processor defines the determination distance as at least one of a distance between the map road division line on a left side and the map road center line and a distance between the map road division line on a right side and the map road center line.

3. A vehicle control device comprising a storage medium storing computer-readable commands, and a processor connected to the storage medium, the processor being configured to execute the computer-readable commands to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to a camera road division line included in the surrounding situation when it is determined that the determination angle is equal to or larger than the first threshold value, the determination distance is equal to or larger than the second threshold value, and the forward region of the vehicle does not correspond to the predetermined region, wherein the processor defines the determination angle as at least one of a peak angle between the map road division line on a left side and the map road center line and a peak angle between the map road division line on a right side and the map road center line.

4. A vehicle control device comprising a storage medium storing computer-readable commands, and a processor connected to the storage medium, the processor being configured to execute the computer-readable commands to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to a camera road division line included in the surrounding situation when it is determined that the determination angle is equal to or larger than the first threshold value, the determination distance is equal to or larger than the second threshold value, and the forward region of the vehicle does not correspond to the predetermined region, wherein the processor determines whether or not the determination angle is equal to or larger than the first threshold value and is equal to or smaller than a third threshold value, which is larger than the first threshold value, and when determining that the determination angle is equal to or larger than the first threshold value and is equal to or smaller than the third threshold value, continues the second driving mode referring to the camera road division line.

5. The vehicle control device according to claim 4, wherein when determining that the determination angle is equal to or larger than the first threshold value and is equal to or smaller than the third threshold value, the processor determines whether or not the map road division line and the camera road division line match each other for at least a part thereof, and when determining that the map road division line and the camera road division line match each other for at least a part thereof, the processor continues the second driving mode referring to the camera road division line.

6. The vehicle control device according to claim 5, wherein even when determining that the map road division line and the camera road division line do not match each other for at least a part thereof, the processor continues the second driving mode referring to at least a travel trajectory of a preceding vehicle when there is a preceding vehicle in front of the vehicle.

7. A vehicle control device comprising a storage medium storing computer-readable commands, and a processor connected to the storage medium, the processor being configured to execute the computer-readable commands to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to a camera road division line included in the surrounding situation when it is determined that the determination angle is equal to or larger than the first threshold value, the determination distance is equal to or larger than the second threshold value, and the forward region of the vehicle does not correspond to the predetermined region, wherein the processor defines the predetermined region as a lane increase section, a lane decrease section, or a section in which a road curvature is equal to or larger than a predetermined value on a travel lane on which the vehicle is traveling.

8. A vehicle control device comprising a storage medium storing computer-readable commands, and a processor connected to the storage medium, the processor being configured to execute the computer-readable commands to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to a camera road division line included in the surrounding situation when it is determined that the determination angle is equal to or larger than the first threshold value, the determination distance is equal to or larger than the second threshold value, and the forward region of the vehicle does not correspond to the predetermined region, wherein when a number of points included in a point cloud constituting the map road division line and the map road center line included in the map information is equal to or larger than a predetermined value, the processor calculates the determination angle and the determination distance based on the point cloud.

9. A vehicle control device comprising a storage medium storing computer-readable commands, and a processor connected to the storage medium, the processor being configured to execute the computer-readable commands to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to a camera road division line included in the surrounding situation when it is determined that the determination angle is equal to or larger than the first threshold value, the determination distance is equal to or larger than the second threshold value, and the forward region of the vehicle does not correspond to the predetermined region, wherein when the second driving mode is changed to the first driving mode referring to the camera road division line, the processor continues the first driving mode referring to the camera road division line for at least a first predetermined period.

10. The vehicle control device according to claim 9, when determining that the determination angle is smaller than the first threshold value and the determination distance is smaller than the second threshold value after continuing the first driving mode referring to the camera road division line for the first predetermined period, the processor returns the first driving mode referring to the camera road division line to the second driving mode referring to the map road division line.

11. A vehicle control device comprising a storage medium storing computer-readable commands, and a processor connected to the storage medium, the processor being configured to execute the computer-readable commands to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region; and change the second driving mode to the first driving mode referring to a camera road division line included in the surrounding situation when it is determined that the determination angle is equal to or larger than the first threshold value, the determination distance is equal to or larger than the second threshold value, and the forward region of the vehicle does not correspond to the predetermined region, wherein when it is determined that the determination angle is equal to or larger than the first threshold value or the determination distance is equal to or larger than the second threshold value after continuing the first driving mode referring to the camera road division line for a second predetermined period, the processor changes the first driving mode to manual driving of the vehicle by the driver of the vehicle.

12. A vehicle control method to be executed by a computer, the vehicle control method comprising:

recognizing a surrounding situation of a vehicle;

controlling steering and acceleration/deceleration of the vehicle based on the recognized surrounding situation and map information without depending on an operation performed by a driver of the vehicle;

determining a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

changing the driving mode of the vehicle to a driving mode imposing a heavier task when the task of the determined driving mode is not performed by the driver;

determining whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region;

changing the second driving mode to the first driving mode referring to a camera road division line included in the surrounding situation when it is determined that the determination angle is equal to or larger than the first threshold value, the determination distance is equal to or larger than the second threshold value, and the forward region of the vehicle does not correspond to the predetermined region, and when the second driving mode is changed to the first driving mode referring to the camera road division line, continuing the first driving mode referring to the camera road division line for at least a first predetermined period.

13. A non-transitory storage medium storing a program for causing a computer to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a determination angle, which is based on an angle between a map road division line and a map road center line included in the map information, is equal to or larger than a first threshold value, whether or not a determination distance, which is based on a distance between the map road division line and the map road center line, is equal to or larger than a second threshold value, and whether or not a forward region of the vehicle corresponds to a predetermined region;

change the second driving mode to the first driving mode referring to a camera road division line included in the surrounding situation when it is determined that the determination angle is equal to or larger than the first threshold value, the determination distance is equal to or larger than the second threshold value, and the forward region of the vehicle does not correspond to the predetermined region, and when the second driving mode is changed to the first driving mode referring to the camera road division line, continue the first driving mode referring to the camera road division line for at least a first predetermined period.

* * * * *